Aug. 2, 1966   J. H. SHARE ETAL   3,263,943
VALUABLES COLLECTION SYSTEM
Filed April 8, 1964   8 Sheets-Sheet 5

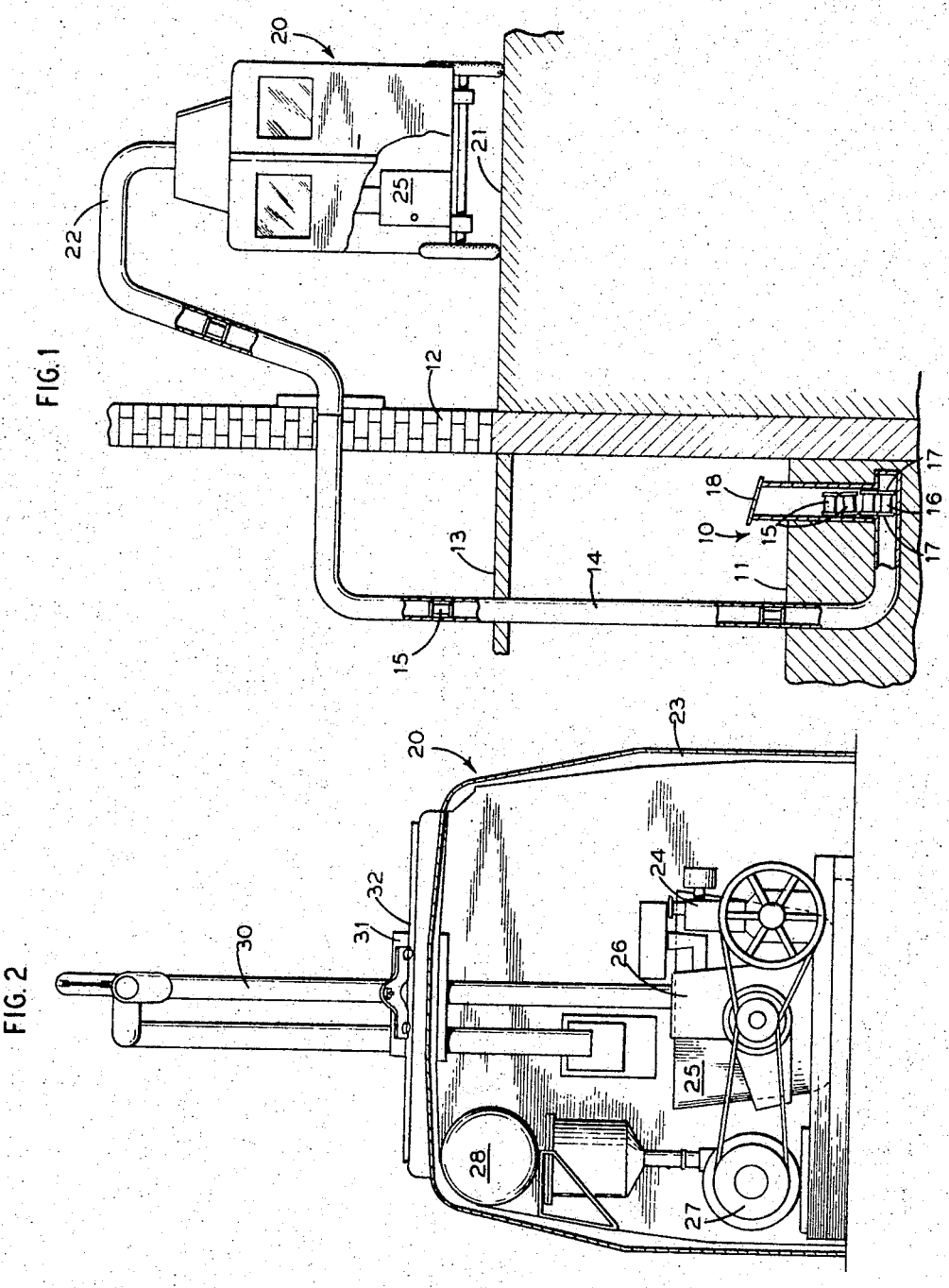

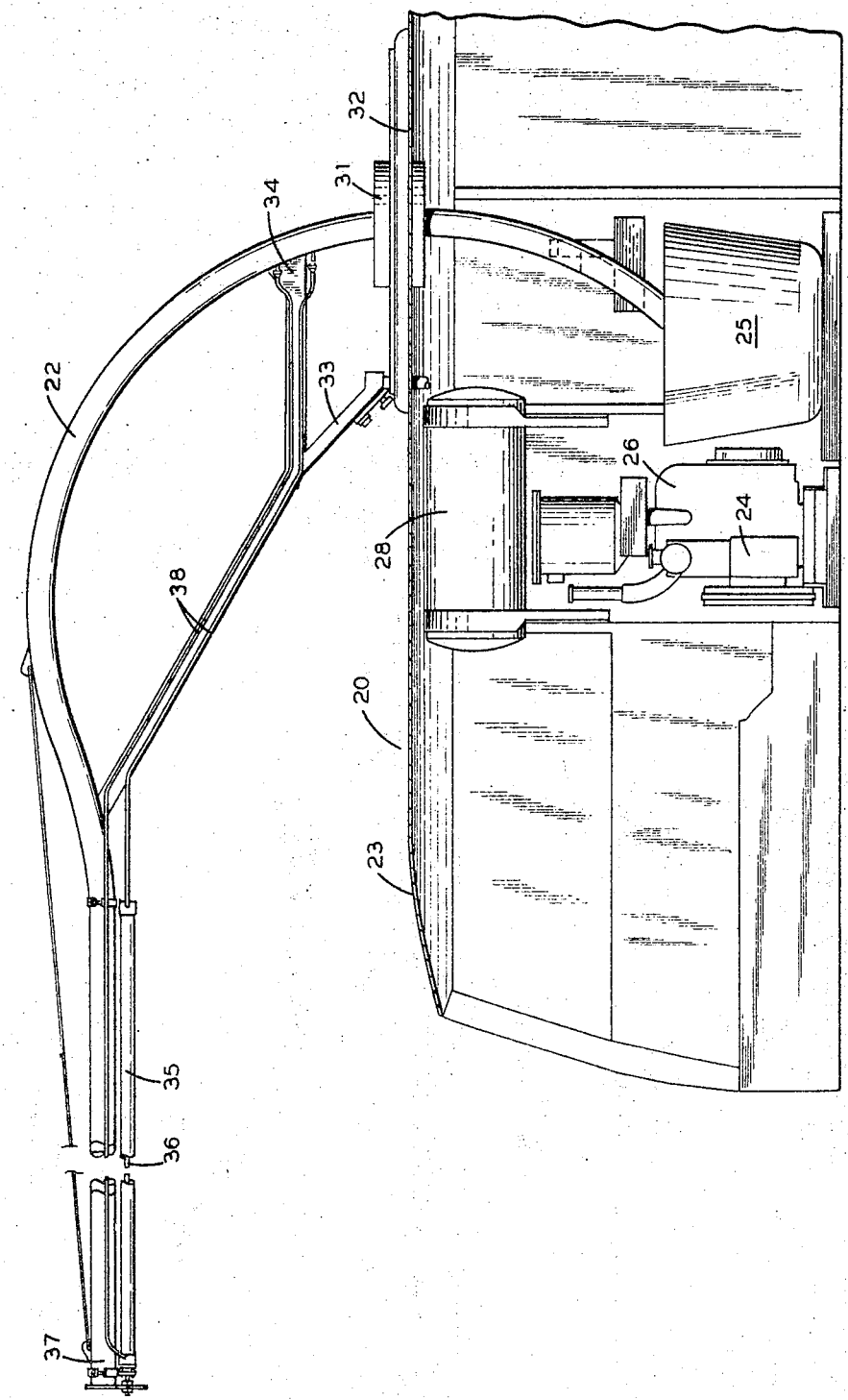

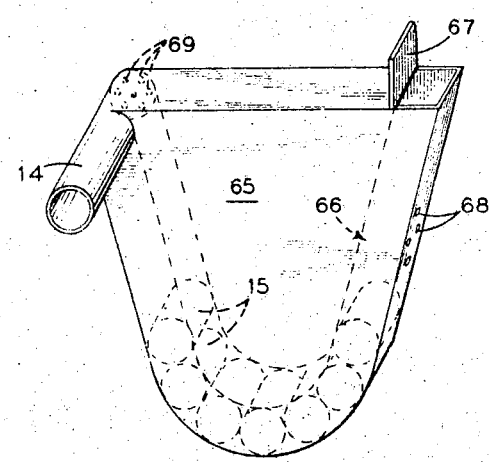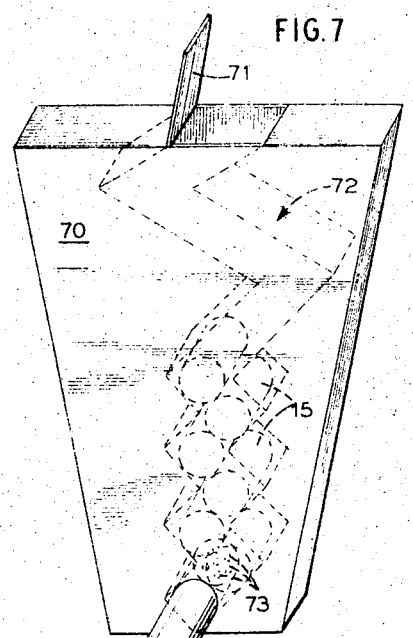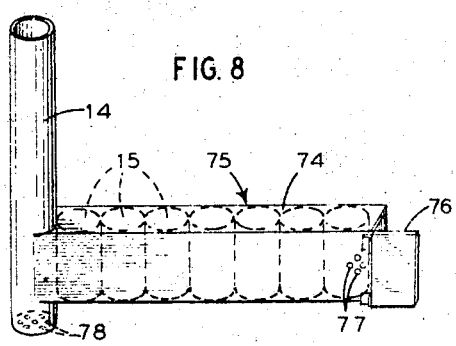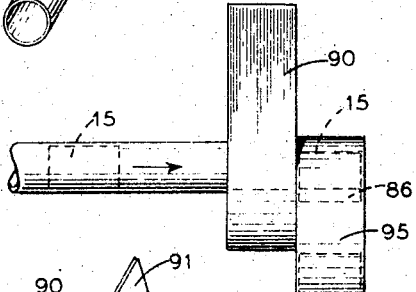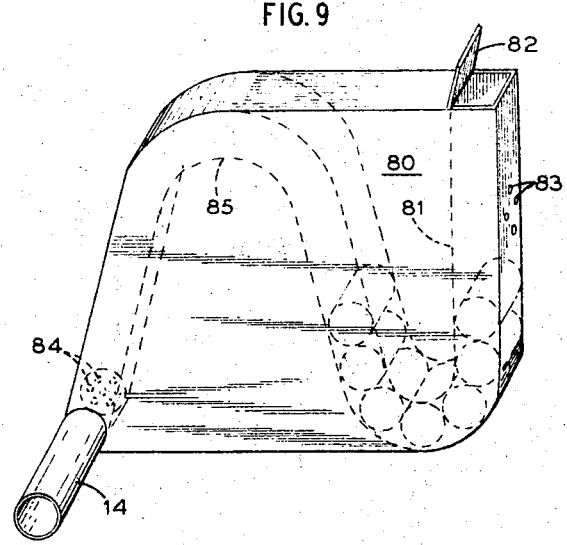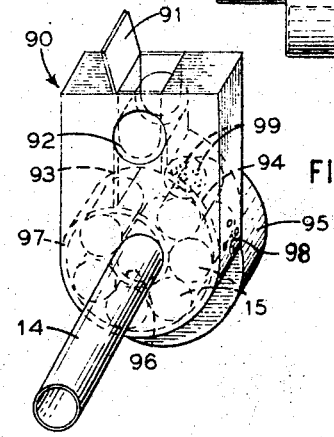

3,263,943
VALUABLES COLLECTION SYSTEM
Jack H. Share, 219—21 Stewart Road, Bayside, N.Y.;
Stanley Share, 132 Greenway, Albertson, N.Y.; and
Barnett Share, 67 Hickory Lane, Roslyn Heights, N.Y.
Filed Apr. 8, 1964, Ser. No. 358,353
10 Claims. (Cl. 243—1)

This invention relates to systems for collecting valuables under top security and, more particularly, to a valuables collection system by means of which containers for valuables may be withdrawn by vacuum from a vault in a building, such as a store or a bank, to a transport vault on a vehicle by the use of a high powered vacuum and without manual access to the valuables containers.

The most common arrangement for collecting valuables is the use of an armored truck with two or more armed guards who collect valuables, such as cash receipts, jewelry and the like from stores, banks, offices, or the like and remove these valuables to the armored truck. The armored truck is then driven to a central location or to the location where the valuables are to be deposited.

This known and commonly used arrangement has its disadvantages. Among the disadvantages are the less than total security of the collection operation in that the guards may, for example, be held up or robbed during carrying of the valuables from a building to the armored truck. Also, there have been instances where the armored truck itself has been waylaid and robbed. Furthermore, an opportunity is presented for dishonest employees of the collection service to abscond with valuables. Accordingly, it has long been recognized that a valuables collection system with greater security than those now in use is highly desirable.

In accordance with the present invention, such a system is provided, and includes a sealed vault within a building connected by a tubular conduit to an exterior surface of the building, with the outer end of the conduit being secured by a door provided with a lock which is preferably a vacuum operated lock. The valuables are placed in cylindrical containers with a plug lock or seal. These containers, after having valuables placed therein, are closed and dropped through a door into the vault, after which they cannot be retrieved from within the building.

A collection vehicle is provided which has a sealed transport vault or chamber thereon. A flexible conduit has an inner end connected to such transport vault and in communication therewith, and this flexible conduit is supported upon a boom or the like which may be extended laterally from the truck, as over parked vehicles, to the wall of a building from which a collection is to be made. The outer end of this flexible conduit is arranged to have a fluid-tight connection with the outer end of the tubular conduit extending through the building wall, after the above-mentioned door has been unlocked and opened. The conduit extending through the building wall may advantageously extend through a plate glass window which can be illuminated during periods of darkness. A source of high vacuum, capable of providing a preselected negative pressure value and a preselected air flow rate, is connected to the transport vault. Thus, when the system on the collection vehicle is connected to the conduit extending through the building wall, the tubular containers within the storage vault within the building are withdrawn by vacuum through the interconnected tubular conduit and flexible conduit and deposited into the sealed transport vault on the vehicle. No human touching of the containers is involved, and there is no handling thereof. Later, the vehicle with its collections in the transport vault is driven to the deposit building where a supervisor, having means for obtaining access to the transport vault, can remove the valuables containers from the transport vault.

The principal feature of the invention is the construction of the storage vault within the building. This storage vault is arranged to have a storage space which receives the valuables containers as they are dropped into the storage vault. This storage space is at a relatively low level, and a guide track extends laterally upwardly from the storage space for a fairly substantial distance. The aforementioned tubular conduit is connected to the guide track at a point spaced substantially from the storage space, with the axis of the end of the tubular conduit extending parallel to a pair of side walls forming two walls of the track and which are spaced by a distance substantially equal to the diameter of the tubular containers.

Apertures are formed in the walls of the storage space, and other apertures are formed in an end wall of the track opposite the inner end of the tubular conduit. Thus, when a vacuum is applied to the tubular conduit, as by connection of the flexible conduit thereto, the inrush of air through the apertures in the storage space agitates the tubular valuables container so that the latter is moved bodily laterally and upwardly to come into axial alignment with the inner end of the tubular conduit. The air rushing through the apertures in the end wall of the guide track opposite the inner end of the tubular conduit effects a rush of air into the tubular conduit, and this carries the cylindrical valuables container into the tubular conduit. The container then passes through this tubular conduit and into the collection or flexible conduit on the vehicle, and from there into the sealed transport vault.

As a feature of the invention, the vault may be provided with a storage space for unused, empty, or fresh containers and, after filled containers have been collected from the storage vault, the operator in the vehicle may reverse the air flow direction, as by applying positive air pressure to the vehicle end of flexible conduit, and thereby feed fresh or unused containers through the flexible conduit and the tubular conduit and through the vault into the storage space. This storage space is accessible to the proprietor or someone in charge at the location of the storage vault, so that the fresh or unused containers may be removed therefrom and refilled with valuables.

Preferably, the door on the outer end of the tubular conduit extending through the wall of the building is provided with a vacuum operated lock of the type shown and described in Share, U.S. Patent 3,034,705, which is a lock which may be opened only when a predetermined vacuum has been applied to a locking pin.

For an understanding of the principles of the invention, reference is made to the following description of typical embodiments thereof as illustrated in the accompanying drawings. In the drawings:

FIG. 1 is a somewhat schematical vertical sectional view illustrating the overall collection system;

FIG. 2 is a transverse sectional view through the body of the collection vehicle;

FIG. 3 is a longitudinal sectional view through a portion of the body of the collection vehicle;

FIGS. 6 through 10 are somewhat schematic perspective views of various forms of storage vaults embodying the invention;

FIG. 11 is a somewhat schematic side elevational view of the storage vault shown in FIG. 10;

Figure 5:
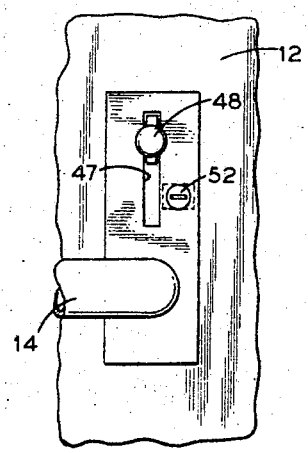
FIG. 5 is a partial inner end elevational view corresponding to FIG. 4.

Referring first to FIGS. 1 through 5, the overall system of the invention is illustrated as including a storage vault 10 which may, for example, be embedded in a concrete floor 11 of a building having an outside wall 12. Alternatively, vault 10 could be positioned on the first floor 13 of the building so as to be visible through a plate glass window or the like for inspection during night hours, with the area containing the vault 10 being adequately illuminated.

A tubular conduit 14 extends from and communicates with the interior of vault 10 and has an outer end terminating adjacent the outer surface of exterior wall 12. As an alternative arrangement, conduit 14 may terminate in a plate glass window insert in wall 12. For this latter embodiment, the glass can be illuminated during periods of darkness. The valuables are arranged to be enclosed within cylindrical containers 15, each including a cylindrical tubular body portion 16 and enlarged circular ends 17 each arranged to have a fluid-tight fit within conduit 14. As containers 15 are filled with valuables, they are closed and dropped into vault 10 through a security door 18 on the upper end thereof.

The bottommost container 15 is in tubular conduit 14 which extends longitudinally of the bottom end of vault 10. Suitable apertures (not shown in FIG. 1) are provided in the wall of conduit 14 adjacent its communication with vault 10. When a vacuum is applied to the outer end of tubular conduit 14, the inrush of air through these apertures causes the container 15 when within the tubular conduit to be moved forcibly laterally and upwardly through conduit 14 to the outer end thereof. As each container 15 moves outwardly through conduit 14, the next container 15 thereabove drops into position in the conduit and is correspondingly moved laterally and upwardly through the conduit.

The means for applying the vacuum to the outer end of conduit 14, and for collecting the containers 15, comprises a vehicle 20 which may be, for example, a suitably constructed and preferably armored truck. Within vehicle 20 there is a sealed transport vault 25 which can be opened only at the place of deposit of the valuables. Vehicle 20 may operate in the roadway 21 adjacent the sidewalk. A flexible conduit 22 is connected to and communicates with the interior of the transport vault 25 and has an outer end arranged for fluid-tight coupling to the outer end of tubular conduit 14. A source of vacuum at a predetermined relatively low negative pressure and providing a predetermined rate of flow of air through conduit 22 is connected to vault 25 to apply a vacuum through conduit 22. When the outer end of conduit 22 is coupled to the outer end of conduit 14, this vacuum is effective upon the containers 15 within the vault 10, with air flow through the mentioned apertures, to draw these containers through tubular conduit 14, through flexible conduit 22, and into transport vault 25. When the collections at a given location are completed, conduit 22 is uncoupled from conduit 14, and a security door is replaced in position to close the outer end of conduit 14. The truck, after having made all its collections, drives to a central location or deposit location, where a suitably equipped supervisor unlocks the vault 25 and removes the valuables therefrom.

Truck 20 includes a body 23 within which there is mounted a suitable power means such as an internal combustion engine 24. Engine 24, through the indicated belt drives, drives a vacuum pump 26 and an air compressor 27. Compressor 27 is suitably connected to a storage tank 28.

Flexible conduit 22 is supported upon a boom 30 on a turntable 31 rotatable about a bearing 32 on the roof of body 23. Boom 30 is suitably braced by members such as 33 and 34. A cylinder 35 is mounted on boom 30 and has a double acting piston secured to a piston rod 36 whose end is connected to a telescopically extendable forward section 37 of tubular conduit 22, and which is in telescopic fluid-tight engagement with conduit 22. Air lines 38, connected to opposite ends of cylinder 35, are connected, through a suitable control valve, to the air in tank 28 so that piston cylinder combination 35–36 may be extended or retracted as desired to extend or retract the telescopic section 37 of flexible conduit 22. Vacuum pump 26 is connected to the interior of vault 25. Thus, when the outer end of extension 37 of flexible conduit 22 is coupled to the outer end of tubular conduit 14, a vacuum may be applied to tubular conduit 14 and thus to vault 10 to withdraw containers 15 from vault 10 for travel through the coupled conduits into the transport vault 25 on vehicle 20.

Figure 4:
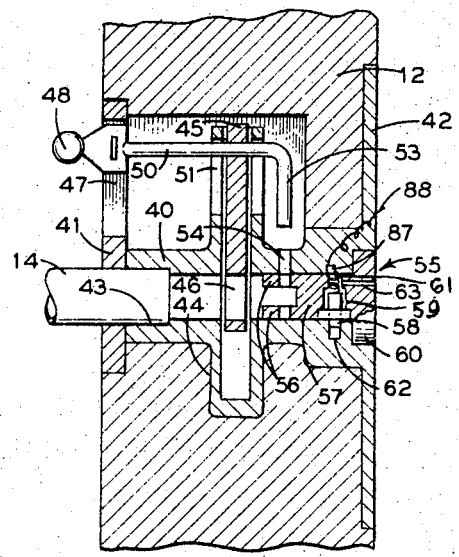
FIG. 4 is a sectional view of the outer end of the tubular conduit as it passes through the wall of a building, and illustrating the lock.
Figure 20:
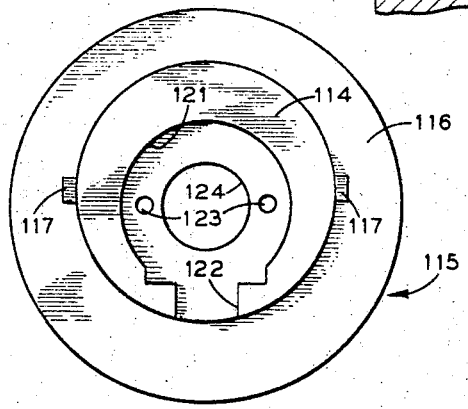
FIG. 20 is an inner end elevational view of a device for rotating the trough and seal of FIGS. 18 and 19.
Figure 21:
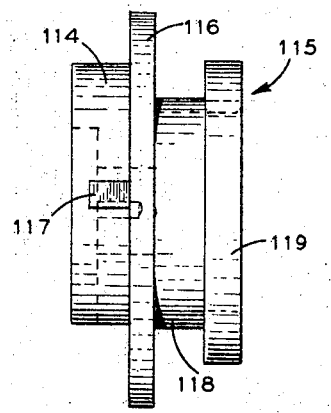
FIG. 21 is a side elevational view of the device shown in FIG. 20.
Figure 22:
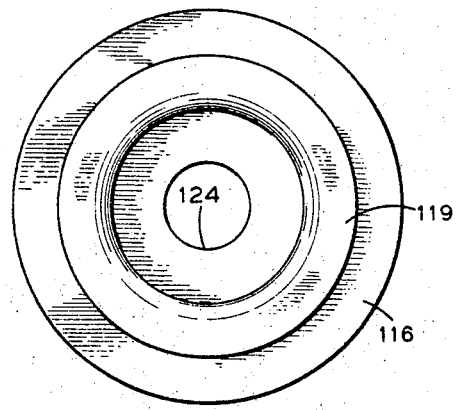
FIG. 22 is an outside elevational view thereof.

Referring particularly to FIGS. 4 and 5, a suitable security lock is provided for the outer end of conduit 14. The outer end of conduit 14 is anchored in a plate 41 which is recessed into the inner surface of exterior wall 12. An outer plate 42 is recessed into the outer surface of wall 12 and has integral therewith a generally tubular extension 40 which sealingly abuts against the plate 41 and has an enlarged recess 43 seating the outer end of conduit 14. Tubular extension 40 is formed with a radial enlargement 44 intermediate its ends and disposed in an enlarged recess in wall 12. Enlargement 44 forms a space receiving a plate valve 45 having an aperture 46 therethrough. Plate 41 is formed with a vertically extending slot 47 which receives and guides the operating handle 48 of an operating member 50 which extends through vertical slots 51 in extension or enlargement 44 and through an aperture in plate valve 45. Operating member 50 is provided with suitable means for retaining it in either the upper or the lower position, and it may be locked in the lower position by means of a lock indicated generally at 52.

When operating handle 48 is lowered, member 50 lowers valve 45 so as to block communication through tubular extension 40 and thus seal off the outer end of tubular conduit 14. When operator 50 is lowered, a bent end 53 thereof passes through an aperture 54 in tubular extension 40 and through apertures in spaced legs 56 extending from the inner end of the body 57 of a vacuum lock 55. Body 57 is formed with a radial chamber 59 which slidably mounts a locking pin or bolt 58. Bolt 58 is biased outwardly by a coil spring 61 so that it will enter a cylindrical recess 62 extending radially from the inner surface of tubular extension 40. A cylindrical face plate 60 is integral with body 57 and seats in a recess in the plate 42. A passage or bore 63 extends longitudinally through face plate 60 and communicates, at its inner end, with chamber 59 and at its outer end with the outer face of plate 60.

When the end of flexible conduit 22 is placed against the outer surface of plate 60, the resulting vacuum applied through passage 63 to chamber 59 draws pin 58 inwardly to retract pin 58 from recess 62 so that the entire valve body may be removed thus allowing the vacuum hose 22 to have its end applied to the recess seating the plate 60. However, before the lock 55 may be withdrawn, the operating handle 48 must be lifted to disengage bent end 53 from the legs 56 of lock body 57. This provides double security for the system, so that both an internally accessible lock and an externally accessible lock must be operated for withdrawal of lock body 55. The operation of lock body is more fully described in said Share Patent 3,034,705 wherein it is shown in detail in FIGS. 4 and 5. It should be understood, however, that while a vacuum type lock 55 is preferred, an ordinary key operated lock or combination operated lock could be substituted for the vacuum lock 55.

For additional security, an insulated contact 87, connected to an alarm circuit through a lead 88, may be provided. Contact 87 completes the circuit through lock body 57. Thus, when the vacuum lock is withdrawn, the alarm circuit is triggered to alert interested personnel unless an authorized person has disabled the alarm system for the purpose of permitting an authorized collection.

As stated, FIGS. 6 through 11 show, somewhat schematically, various forms which the vault 10 may take in practice. Referring to FIG. 6, the vault 65 as shown therein has a generally U-shape guide track 66 constituted by parallel inner and outer walls which are spaced apart laterally a distance substantially equal to the diameter of the ends 17 of containers 15. Adjacent one end of track 66, a door 67 allows the containers 15 to be dropped into track 66. Also, adjacent this end, the outer wall of track 66 is formed with a series of apertures 68 for allowing an inrush of air into track 66 to displace containers 15 bodily toward the other end of the track. The tubular conduit 14 communicates with the other end of track 66 with its axis extending parallel to the spaced parallel walls of the track, and an end wall of the track is formed with apertures 69 which are aligned with tubular conduit 14. Thus, when a vacuum is applied to conduit 14, the resulting inrush of air through aperture 68 moves containers 15 into alignment with conduit 14, and the air inrushing through apertures 69 forces the containers to pass outwardly through the conduit 14.

FIG. 7 shows a vault 70 which is an inverted trapezoid in elevation and includes a door 71 in its top wall whereby containers 15 may be dropped into a generally zig-zag track 72. The zig-zag arrangement of track 72 prevents withdrawal of containers 15 from the track after they have once been deposited therein. It should be understood, however, that instead of track 72 being zig-zag, it could be provided with baffles extending alternately in opposite directions to attain the same effect. Conduit 14 communicates with the lower end of track 72, with the axis of conduit 14 extending parallel to the parallel walls of track 72. An end wall of vault 70 is formed with air inlet apertures 73 in alignment with the end of conduit 14. When a vacuum is applied to tubular conduit 14, air rushing through the aperture 73 forces a container 15 to move outwardly through conduit 14. This embodiment of the vault differs from that of the others in that it does not have provision whereby a container 15 must be elevated laterally and outwardly before it can become aligned with conduit 14.

FIG. 8 shows another form of vault 75 which includes a substantially rectangular guide track 74 extending horizontally and provided with a door 76 at its free end. Air inlet apertures 57 are provided in track 74 adjacent door 76. Conduit 14 is laterally in communication with track 74 at the opposite end of the latter, and the end of conduit 14 is provided with a series of air inlet apertures 78. Containers 15 are placed endwise in track 74 and door 76 is closed. With vacuum applied to conduit 14, air rushing through apertures 77 moves containers 15 to the left and into alignment with conduit 14. The air entering through inlet 78 thereupon moves the containers upwardly in conduit 14.

FIG. 9 illustrates a vault 80 in which the guide track is formed with a section 81 extending vertically downwardly from a door 82. The outer wall of section 81 is formed with air inlet apertures 83 a little below door 82. Section 81 is continued as an inverted U-shape track section 85 which extends upwardly, then curves to the left, and then extends downwardly. At the end of section 85, the latter communicates with the conduit 14 and an end wall of vault 80 is formed with a series of air inlet apertures 84 which are aligned with conduit 14. As in the embodiments previously described, when a vacuum is applied to tubular conduit 14, the air will rush through apertures 83 and move the containers 15 upwardly along the first leg of track section 85 and then downwardly along the exit leg thereof into alignment with conduit 14. The air entering through air inlets 84 will thereupon force the containers 15 to move outwardly through conduit 14.

FIGS. 10 and 11 illustrate a preferred form of vault 90, a constructional embodiment of which is shown and described in detail in connection with FIGS. 12 through 24. Vault 90 has associated therewith a receiver 95 for receiving fresh or unfilled containers 15. Containers 15 may be dropped into vault 90 through an opened door 91 in the top wall of the vault. The containers first fall onto an oscillatable semi-cylindrical receiver 92 which also forms a seal for the air passages and container tracks within the vault. When receiver 92 is rotated through a predetermined arc, a container 15 therein will drop into a vertical track section 93 and thence into an arcuate track section 94. Normally, the containers 15 will rest on the lowest level of track section 94.

Arcuate track section 94 is coaxial with a cylindrical track section, or exit track, 96 which is axially aligned with conduit 14. In order for containers 15 to reach exit track 96, they must move laterally and upwardly around a spiral track section 97 which interconnects track section 94 and exit track section 96. Such movement is effected by air rushing through inlet apertures 98 in a wall of track section 94, such air rushing in when a vacuum is applied to tubular conduit 14. When a container moves into exit track section 96, it is moved outwardly through conduit 14 by air rushing through the air inlets 99 in a wall of vault 90 and aligned with conduit 14.

The receiver 95 for fresh or unfilled containers has a circular aperture therein which communicates with the exit track section 96, and rails 86 extend from vault 90 substantially or at least partially through the receiver 95. To move unfilled containers into receiver 95, these are placed in the conduit 22 and the air flow is reversed so that the containers are forced under positive pressure through conduit 22, conduit 14 and along exit track section 96 onto rails 86. The containers drop from rails 86 into receiver 95.

Figure 12:
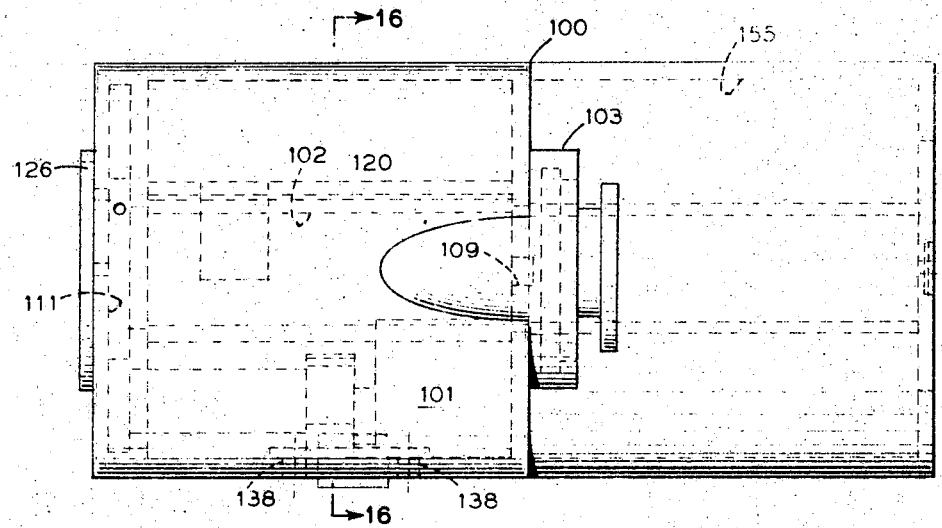
FIG. 12 is a top plan view of the body of the vault shown in FIGS. 10 and 11.
Figure 13:
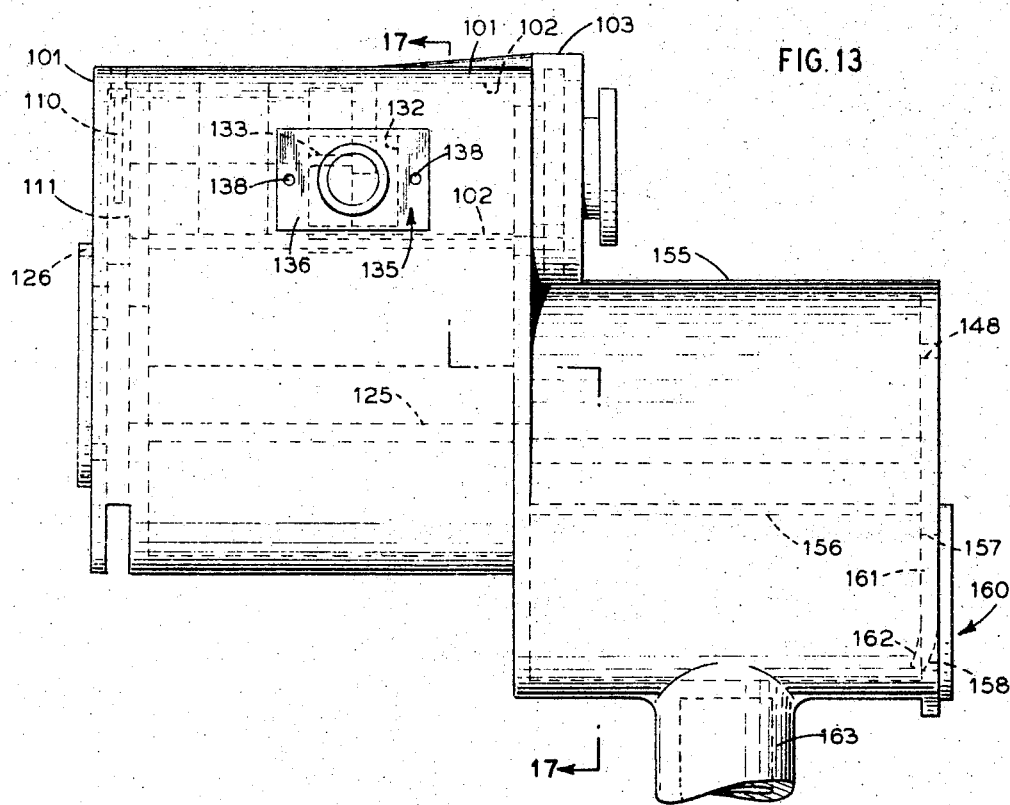
FIG. 13 is a side elevational view of the vault body shown in FIG. 12.
Figure 14:
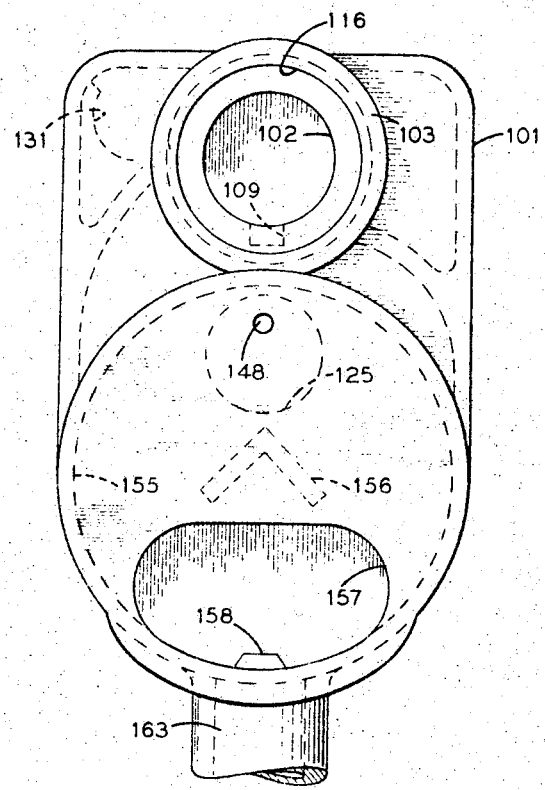
FIG. 14 is an elevational views looking from the right of FIGS. 12 and 13.
Figure 15:
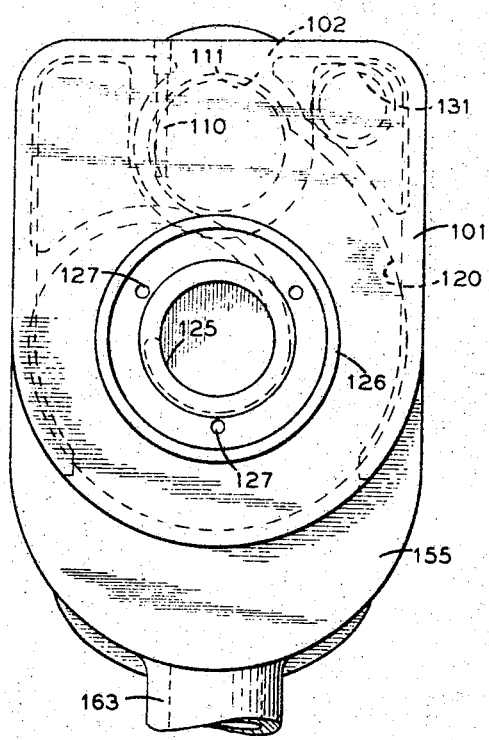
FIG. 15 is an elevational view looking from the left of FIGS. 12 and 13.

A commercially practical embodiment of a vault 90 combined with receiver 95 is shown in FIGS. 12 through 24. Referring to these figures, the unit includes a cast body generally indicated at 100. Body 100 includes an upwardly extending portion 101 which is formed with a generally cylindrical longitudinal bore 102. Bore 102 opens through an enlarged right end 103 as best seen in FIGS. 12 and 13. This bore oscillatably mounts a combined container receiver and air seal member 105 best seen in FIGS. 18 and 19. Air seal receiver 105 includes a semi-cylindrical body 106 which extends between a circular end wall 107 and an annular end wall 108. Circular end wall 107 has an arcuate cross section peripheral groove 104 extending through about 270 degrees of its circumference. This circular end wall is arranged to enter into an enlargement 111 of bore 102 at the left end of the latter. Air seal and receiver 105 is locked against axial displacement by a pin 110 dropped through a bore which is tangent to groove 104, so that the end of pin 110 enters into this groove and permits rotation of member 105 through a limited angular extent. Annular wall 108 is formed with a pair of diametrically opposite notches 112 opening outwardly therewith, and with a notch 113 opening inwardly thereof.

Normally, member 105 occupies a position in which body section 106 opens upwardly to receive a container 15 inserted through anular end wall 103. Normally, wall 103 is closed by a circular door 115 best seen in FIGS. 20, 21, and 22. Door 115 includes a cylindrical portion 114 adjacent which is an enlarged flange 116 which is eccentric with respect to portion 114. Body portion 114 is formed with a pair of radial ears 117 which are diametrically opposite each other and which are arranged to engage in the notches 112 in wall 108 of member 105. A reduced tubular body section 118 is concentric with flange 116 and extends from the outer surface thereof, section 118 terminating in an enlarged annular flange 119. The inner surface of portion 114 is formed with a nearly circular recess 121 which is concentric with flange 116 and has a radial extension 122 opening through the outer surface of portion 114. A pair of diametrically opposite tapped recesses 123 are formed in the inner diametric surface of recess 121, and a bore 124 extends coaxially from the bottom of recess 121 through flange 116 and into the tubular body 118.

A key-operated lock may be mounted in recess 121 of cover plate 115, being secured by studs engaged in tapped bores 123. This lock may have a pin or the like slidable longitudinally of radial notch 122 and through notch 113 of receiver 105 for engagement in a latch recess 109 in the inlet end opening of bore 102, thus retaining receiver 105 in a predetermined angular orientation. A suitable sealing gasket may be interposed between flange 116 and end wall 103 of offset portion 101.

To insert a container into bore 102, door 115 is unlocked and withdrawn and the container is inserted into receiver 105. Door 115 is then repositioned with ears 117 engaging in notches 112, and the door may be rotated to invert member 105 to dump out the container 115, and then relocked.

Figure 16:
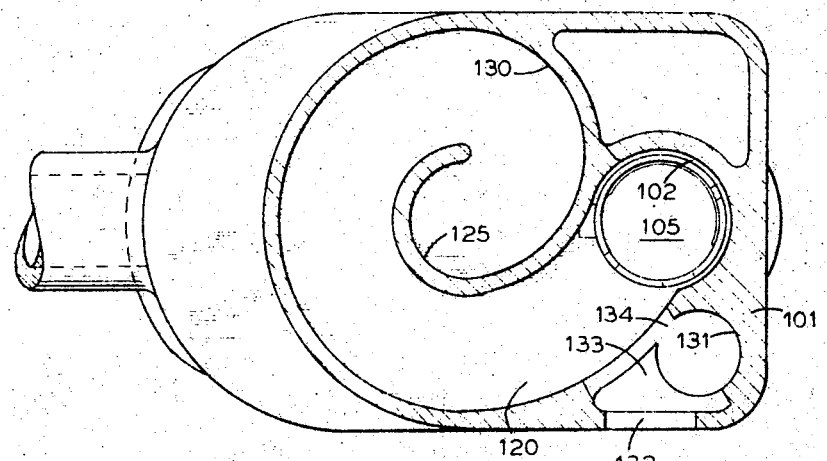
FIG. 16 is a sectional view taken on the line 16—16 of FIG. 12.
Figure 17:
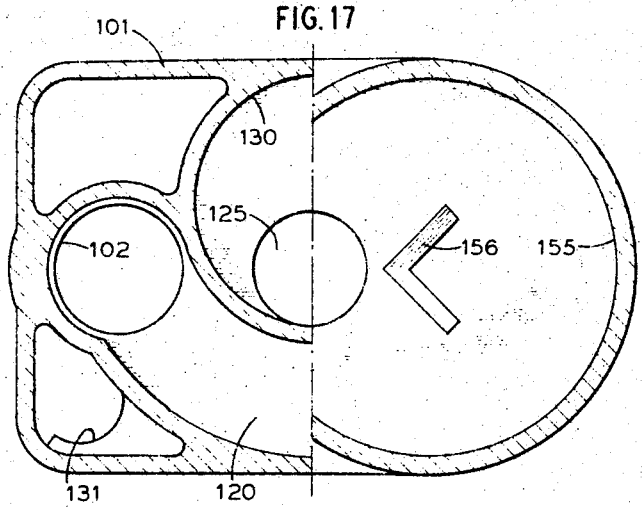
FIG. 17 is a sectional view taken on the line 17—17 of FIG. 13.
Figure 19:
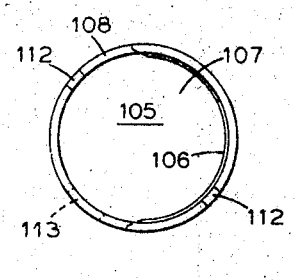
FIG. 19 is a right end elevational view of the trough and seal shown in FIG. 18.
Figure 18:
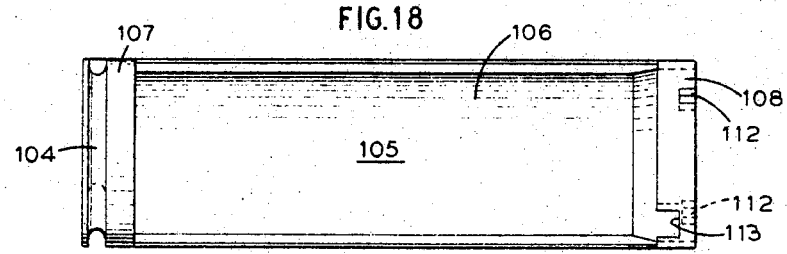
FIG. 18 is a plan view of an oscillatable container trough and seal used with the vault body shown in FIGS. 12 through 17.

When a container is thus dumped out, it travels along a curved track section 120 extending laterally and downwardly from bore 102, as best seen in FIGS. 16 and 17. Bore 102 thus forms an entry track section similar to the track section 93 of FIGS. 10 and 11, with curved track 120 corresponding to track 94 of FIGS. 10 and 11. The containers rest at the bottommost portion of track 120.

A cylindrical exit track section 125 opens through the front end of the vault through an enlarged annular rib 126 which embraces an attachment surface for the inner end of conduit 14. Conduit 14 may be anchored to body 100 by screws or studs or the like engaged in tapped holes 127 just inside of rib 126. Curved track section 120 is connected to exit track section 125 by a spiral track section 130 corresponding to the spiral track section 97 of FIGS. 10 and 11.

Air for moving the containers from circular track section 120 into exit track section 125 is provided in the following manner. There is a bore 131 through the upper offset portion 101 of body 100, bore 131 extending parallel to bore 102. A rectangular aperture 132 is formed in a side wall of upper portion 101 of body 100 and is connected, through a port 133, to the interior of bore 131. A port 134 in the side wall of curved track section 120 connects the latter to the interior of bore 131.

Figure 23:
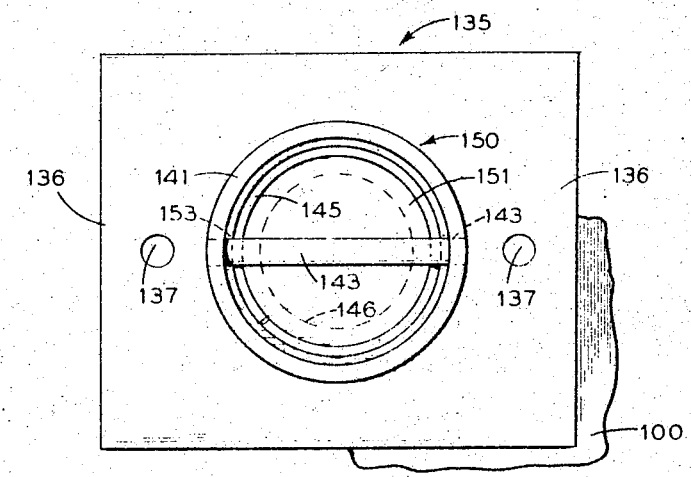
FIG. 23 is an inside end elevational view of a valve assembly controlling admission of air to the vault of FIGS. 12 through 22.
Figure 24:
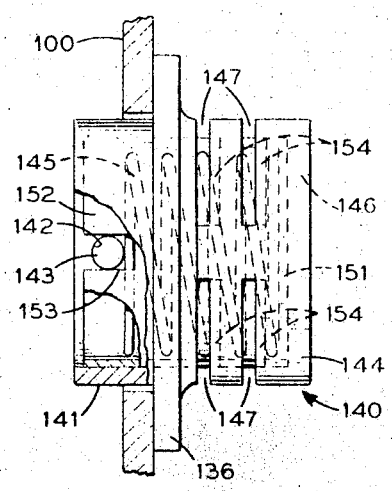
FIG. 24 is a part side elevational view and part axial sectional view of the valve assembly shown in FIG. 23.

Aperture 132 is closed by the valve assembly 135 best shown in FIGS. 23 and 24. Referring to these figures, a valve body is illustrated as formed with a substantially rectangular flange 136 which is substantially larger than the rectangular opening 132. Flange 136 is formed with a pair of apertures 137 arranged to receive studs threaded into correspondingly located apertures 138 in the side wall of part 101 of body 100. A tubular boss 141 extends inwardly from flange or plate 136 and is formed with a pair of diametrically aligned apertures 142 which receive a pin 143 having a press fit therein and extending diametrically of boss 141.

A tubular boss 140 projects outwardly from flange 136 and has an outer end wall 144 formed with a circular aperture 146. The peripheral wall of boss 140 is formed with two pairs of slots 147, the slots of each pair being diametrically aligned with each other and each slot extending through somewhat less than 180 degrees. Boss 140 slidably receives a generally tubular valve member 150 which is telescoped therein. Valve member 150 is generally cup shaped and includes a relatively thin imperforate circular end wall 151 facing wall 144, and a cylindrical side wall 152 which, at the open end of member 150, is formed with a pair of diametrically opposite notches or slots 153 arranged to have a clearance fit over pin 143. A spring 145 is seated within side wall 152 and bears between end wall 151 and pin 143 normally to bias end wall 151 of valve 150 against end wall 144 of boss 140. Side wall 152 is further formed with two pairs of arcuately extending slots 154, with the slots of each pair being aligned with each other and with each slot extending through substantially somewhat less than 180 degrees. Slots 154 have the same axial spacing as slots 147 but are so positioned, with relation to end wall 151, that when this end wall 151 is engaged with end wall 144 of boss 140, slots 154 are out of alignment with the slots 147 and the imperforate portions of side wall 153 of valve member 150 block off slots 147. Thus, under the bias of spring 145, valve 150 blocks air flow to track section 120. A suitable gasket is interposed between flange 136 and the side wall of upper extension 101 of body 100.

Body 100 includes a lower extension which is offset from extension 101, and forms a receiving container or storage space 155 for empty reusable containers 15. The inner end of exit track 125 opens into storage container 155 as best seen in FIG. 17. A rail 156 extends between the end walls of storage space 155, and is an inverted V in cross section. Containers 15 forced by positive air pressure through tubular conduit 14 enter exit passage 125 and pass through the end opening thereof into container storage space 155. As the containers enter this storage space, they fall toward the bottom thereof, being deflected to either side of rail 156. Access to these empty and reusable containers 15 is afforded through an opening 157, which is generally oval and somewhat arcuate. Opening 157 may be closed by a generally oval shaped cover 160 having an inner boss 161 fitting within the opening 157 and formed with a tongue 162 engageable over a ledge 158 extending from the inner edge of opening 157. A boss 163 extends downwardly from the bottom portion of storage container portion 155 of body 100, being integral therewith, and is arranged to be seated upon a support post or the like.

A suitable gasket may be placed between cover 160 and the end wall of storage container portion 155. Cover 160 may be provided with a suitable key-operated lock by means of which it may be maintained assembled to storage container portion 155.

The operation of the vault shown in FIGS. 12 through 24 may be summarized as follows. To load the vault, door 115 is unlocked and removed, and a container 15 is inserted into the carrier 105 within bore 102. Door 115 is then replaced in position and turned so that the latch of its lock will be aligned with the latching recess 109. This inverts the holder or cradle 106 to dump the container 15 into entry passage 120. Door 115 is then locked.

When a suitable vacuum is applied to tubular conduit 14, this vacuum will be operative upon valve 150 to move the same inwardly against the force of spring 145. This will align slots 154 of valve 150 with the slots 147 of tubular boss 140 so that air can rush through these aligned slots and through opening 132 and port 133 into bore 131. The air will then also rush in through port 134 into track section 120, and will agitate a container in this passage so that the latter will be pushed up along spiral track 130 to fall into exit track 125. The air will also rush through an inlet aperture 148 in the end wall of storage container 155 and through passage 125 to force the container 15 to move outwardly of passage 125 and into tubular conduit 14 for collection in the manner previously described.

To feed storage containers into receiving space 155, a positive air pressure is applied to conduit 14, as described, to force the container 15 to move in the reverse direction therealong and to enter exit track 125. The container moves along exit track 125 and along rail 156 and falls laterally of rail 156 into the storage container 155. The air pressure escapes through the aperture 148.

It should be understood that where a positive air pressure is called for a negative air pressure may be utilized just as well by connecting the vacuum apparatus to the other end of the conduit. Similar comments apply in substituting a negative air pressure for a positive air pressure.

While specific embodiments of the invention have been shown and described in detail to illustrate the application of the principles of the invention, it will be understood that the invention may be embodied otherwise without departing from such principles.

What is claimed is:

1. A valuables collection system comprising, in combination, at least one cylindrical container; a storage vault for such cylindrical container, said vault being formed with a substantially rectangular cross section storage space including parallel side walls spaced by substantially the diameter of said container and interconnected by end walls, one of said side walls being apertured for flow of air into said storage space; a guiding track extending laterally and upwardly from said storage space and including parallel side walls spaced by substantially the diameter of said container and interconnected by end walls; an elongated tubular conduit having an inner end opening through an end wall of said track at a point spaced from said storage space, said conduit having a diameter substantially equal to that of said container and the axis of said inner end being parallel to the side walls of said guiding track; the opposite end wall of said guiding track being apertured in alignment with said conduit inner end for flow of air into said conduit; the outer end of said conduit being formed for connection to a source of high vacuum; a door securing the outer end of said conduit; a lock for said door; a collection vehicle having a sealed transport vault for said container; a flexible conduit having an inner end sealingly communicated with said transport vault and an outer end formed for coupling to the outer end of said tubular conduit following opening of said door; and a source of vacuum on said vehicle connected to said transport vault and effective to apply therein a vacuum of a preselected negative pressure value and a preselected air flow rate to force air to flow through said flexible conduit to said transport vault; whereby, air flowing through the apertures in said one side wall into said storage space will agitate a container therein to move said container upwardly and along said guiding track and into alignment with said elongated tubular conduit; air flowing through said opposite end wall of said guiding track forcing said container to move into said tubular conduit and thence into said flexible conduit and into said transport vault.

2. A valuables collection system, as claimed in claim 1, wherein said lock for said door comprises a spring biased latch which is retractable by vacuum applied to the outer surface of said door.

3. A valuables collection system, as claimed in claim 1, wherein said tubular conduit opens through a wall of a building in which said storage vault is located; said door being mounted on the outer surface of said wall; and latch means operable from within said building and engageable with said door to prevent opening of said door from a position exterior to said wall.

4. A valuables collection system, as claimed in claim 1, including a storage compartment associated with said storage vault and arranged to receive unfilled containers; said opposite end wall of said guiding track having an opening therethrough substantially equal in diameter to that of said elongated tubular conduit and coaxial therewith, said opening communicating with said storage compartment; and a rail in said storage compartment; whereby, upon application of reverse pressure to said tubular conduit, unfilled containers may be moved therealong into said guiding track and through said opening in said opposite end walls onto said rail for deflection by the latter into said storage compartment.

5. A valuables collection system, as claimed in claim 4, in which said storage compartment is formed with an opening in one wall thereof for removing unfilled containers therefrom; and a door closing said opening.

6. A valuables collection system, as claimed in claim 1, including a spring biased valve associated with said one of said side walls apertured for flow of air into said storage space, said spring biased valve normally blocking entry of air into said storage space; said spring biased valve being movable to an open position responsive to application of a vacuum to such storage space through said elongated tubular conduit.

7. In a valuables collection system, at least one cylindrical relatively elongated container for valuables; a storage vault for said cylindrical container; said storage vault comprising a body formed with a tubular bore therein adjacent an upper wall thereof, said tubular bore opening through an end wall of said body; a substantially rectangular cross section guide track, having a length substantially equal to that of one of said containers and a width substantially equal to the diameter of a container, opening into said tubular bore along the length thereof; a semi-cylindrical cradle oscillatably mounted in said tubular bore and normally occupying a position blocking access to said guide track; means operable, when a container is placed in said cradle through said opening in said end wall, to rock said cradle to a position dropping said container into said guide track; said guide track including a substantially circular storage section extending laterally and downwardly from said tubular bore, and a substantially spiral section extending from the lower end of said storage section; said spiral section terminating in a substantially semi-cylindrical exit track section having a diameter of the order of that of one of said containers and having its axis parallel to the longer extent of said guiding track; said exit track section opening through the opposite end wall of said body and being formed for coupling to a relatively elongated tubular conduit; an aperture in a wall of said body for entry of air into said substantially circular storage track section; whereby, upon application of a vacuum of a predetermined negative pressure and capable of effecting a predetermined flow of air to said tubular conduit, air entering through said aperture and into said storage section will move a container in said storage section along said spiral section and into said exit track section for displacement axially into said tubular conduit.

8. In a valuables collection system, a storage vault as claimed in claim 7, including a normally closed spring biased valve controlling said aperture; said valve being moved to a position providing for entry of air through said aperture responsive to application of a vacuum to said tubular conduit.

9. In a valuables collection system, a storage vault as claimed in claim 7, said body being further formed with a storage compartment adjacent said vault and having a wall in common therewith; said exit track section opening through said common wall into said storage compartment; and an inverted V-shaped rail extending across said storage compartment beneath the opening thereinto of said exit track section for deflecting containers moved inwardly from said conduit through said track section into said storage compartment.

10. In a valuables collection system, a storage vault as claimed in claim 7, including a door closing the entry to said substantially cylindrical bore; said door being removable from the opening into said tubular bore for access thereto; and a lock on said door cooperable with a latching recess in said tubular bore and having means interengageable with mating means on said cradle for latching the same in the container receiving position; said door further having means interfitting with mating means on said cradle for rocking the same to the container discharge position.

References Cited by the Examiner
UNITED STATES PATENTS

| | | | |
|---|---|---|---|
| 1,784,967 | 12/1930 | McGuinness | 243—28 |
| 1,951,820 | 3/1934 | Emerson | 243—23 |

EVON C. BLUNK, *Primary Examiner.*

H. C. HORNSBY, *Assistant Examiner.*